United States Patent
Vuong et al.

(10) Patent No.: US 8,612,524 B2
(45) Date of Patent: Dec. 17, 2013

(54) CESSATION OF SENDING NETWORK STATUS MESSAGES TO A SERVER

(75) Inventors: Anh Tuan Vuong, Sacramento, CA (US); Daniel E. Ford, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 12/607,889

(22) Filed: Oct. 28, 2009

(65) Prior Publication Data
US 2011/0099236 A1   Apr. 28, 2011

(51) Int. Cl.
*G06F 15/16* (2006.01)
(52) U.S. Cl.
USPC .......................... 709/206; 709/224; 717/127
(58) Field of Classification Search
USPC .......................................... 709/206, 203, 224
See application file for complete search history.

(56) References Cited

U.S. PATENT DOCUMENTS

| | | | | |
|---|---|---|---|---|
| 5,938,732 A * | 8/1999 | Lim et al. | ...................... | 709/229 |
| 6,167,029 A * | 12/2000 | Ramakrishnan | ............. | 370/235 |
| 6,470,385 B1 * | 10/2002 | Nakashima et al. | .......... | 709/224 |
| 6,651,242 B1 * | 11/2003 | Hebbagodi et al. | ........... | 717/127 |
| 2005/0182848 A1 * | 8/2005 | McNeil et al. | ................ | 709/235 |

* cited by examiner

*Primary Examiner* — Phuoc Nguyen
*Assistant Examiner* — Kishin G Belani

(57) ABSTRACT

A system comprises a processor, a network interface coupled to the processor, and storage accessible to the processor. The network interface is configured to receive network status messages from a plurality of agents across a network. Each network status message indicates a status of a network. The storage comprises a plurality of queues with each queue corresponding to one of the agents. The network status messages from a given agent are stored in a queue corresponding to that agent pending processing by the processor. Upon a number of network status messages in a queue for a particular agent exceeding an agent high water mark, the processor sends a stop message through the network interface to such agent to cause such agent to cease sending network status messages.

15 Claims, 2 Drawing Sheets

CESSATION OF SENDING NETWORK STATUS MESSAGES TO A SERVER

BACKGROUND

Many networks have numerous networking devices such as switches, routers, hubs, and the like. Management devices may be provided within the network to monitor the operation of the network. Such management devices may include a centralized server that receives network status messages from various agents distributed throughout the network. Each network status message provides a status pertaining to some aspect of the network, such as a switch port that has failed, a router that has failed, etc. The centralized server receives all such network status messages and processes them in a suitable fashion.

The centralized server may have responsibilities besides just receiving and processing the network status messages. For example, a user may interact with the centralized server to configure the network in some fashion. It is possible that the volume of network status messages may overwhelm the centralized server effectively preventing the server from doing anything but receiving and processing the network status messages.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "system" refers to a collection of two or more constituent elements. A system may refer to, for example, a computer (e.g., a server), a network of computing devices, or a subsystem within a single computer.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
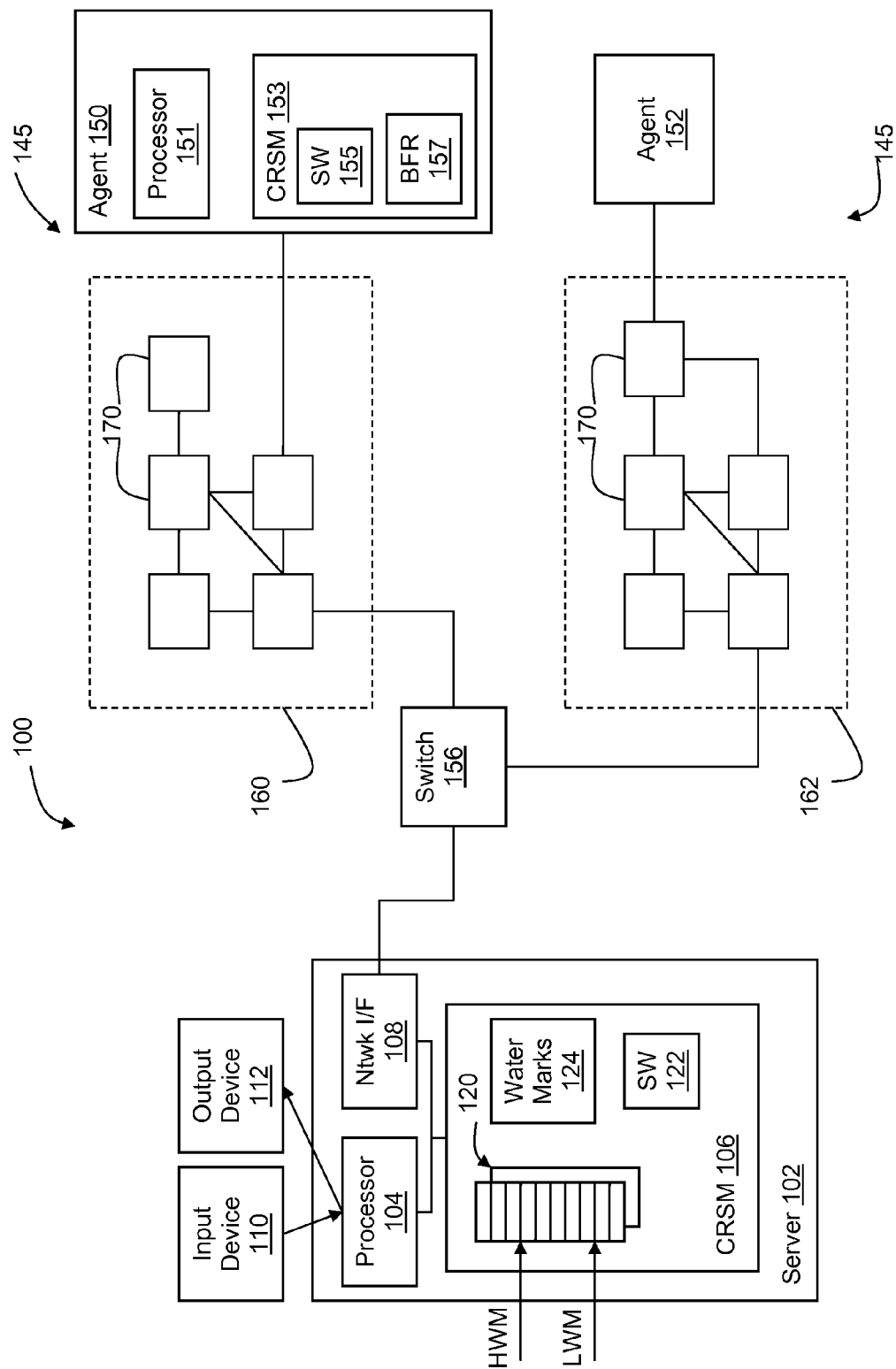
FIG. 1 shows a system in accordance with various embodiments.

FIG. 1 shows an embodiment of a system 100 comprising a centralized server 102 coupled to a network 145. The network 145 may comprise one or more network elements 170 comprising networking devices such as switches (a switch 156 is shown), routers, hubs, etc. as well as end nodes such as client computers, storage devices, printers, and the like.

The server 102 comprises a processor 104 coupled to a computer-readable storage medium (CRSM) 106 and a network interface 108. The CRSM 106 comprises volatile memory such as random access memory (RAM), non-volatile storage (e.g., hard disk drive, read only memory (ROM), compact disc read only memory (CD ROM), etc.), or combinations thereof. Software 122 is provided on the CRSM 106 for execution by the processor 104. The processor 104, executing the software 122, performs one or more or all of the functions described herein that are attributed to the server 102. The server's CRSM 106 also comprises water marks 124, whose use will be explained below. A user may interact with server 102 via an input device 110 (e.g., keyboard, mouse, trackball, etc.) and an output device 112 (e.g., display). In some embodiments, the input device 110 and output device 112 are connected directly to server 102, while in other embodiments, the input and output devices 110, 112 are connected to a remotely located workstation which couples to the server 102 via the network.

One or more agents 150, 152 are included as well in system 100. Each agent 150, 152 is responsible for monitoring the status of a portion of the network 145. As shown, agent 150 monitors portion 160, while agent 152 monitors portion 162. Each portion 160, 162 comprises one or more network elements 170. In accordance with at least some embodiments, each agent 150, 152 is implemented as a computer comprising a processor 151 coupled to a computer-readable storage medium (CRSM) 153. The CRSM 153 comprises volatile memory such as random access memory (RAM), non-volatile storage (e.g., hard disk drive, read only memory (ROM), compact disc read only memory (CD ROM), etc.), or combinations thereof. Software 155 is provided on the CRSM 153 for execution by the processor 151. The processor 151, executing the software 155, performs one or more or all of the functions described herein that are attributed to an agent. The CRSM 153 also comprises a buffer 157, whose use will be described below.

In accordance with some embodiments, each networking element 170 in a given portion 160, 162 of the network sends a message to the relevant agent 150, 152 upon determining that a change in network status has occurred. For example, a router might send a message to the agent if one of the router's redundant power supplies has failed, or a printer might send a message to the agent that the printer is out of paper. The messages are sent asynchronously to the agent in some embodiments. In various embodiments, the message interaction between the networking elements 170 and the agents 150, 152 and between the agents and the server 102 is in accordance with the Simple Network Management Protocol (SNMP). Further, each agent 150, 152 may generate additional network status messages based on correlation of network status messages received from network elements 170. In such or other embodiments, non-SNMP status messages may be generated based on a correlation between messages from various devices or plug-in agent components.

Upon receiving notification of a change in network status, an agent 150, 152 sends a network status message to the server 102 via a network interface 108 provided in the server.

In some embodiments, the messages sent from an agent comprise a block of one or more messages (e.g., multiple of tens or hundreds of messages). The server 102 maintains a queue 120 for each agent. The network status messages received from a given agent 150, 152 are stored in the queue corresponding to that particular agent. With two agents, the server 102 comprises two queues 120. With three agents, the sever 102 comprises three queues, and so on. In various embodiments, the server's processor 104 retrieves the oldest pending network status message from a given queue to process that message. The queues 120 thus are implemented a first in, first out (FIFO) type of buffer. In other embodiments, the server 102 may maintain one queue for multiple or all agents.

The server 102 processes the pending network status messages received from the agents in any suitable fashion. For example, the server 102 may aggregate and log the network status messages, look for trends or issues that are common amongst groups of messages, and the like. The sever 102 may automatically perform such processing or require a user to review the messages to perform such processing.

Each agent 150, 152 sends network status messages to the server 102 without knowledge of whether any other agent is also sending such messages. At any given point in time, the agents 150, 152 may send relatively few network status messages to the server 102 or individually or collectively may send a large number of such messages to the server. The server 102 may or may not be able to keep up with the number of network status messages being received from the agents. Because the agents 150, 152 are remote from the server 102, distributed throughout the network, and operate independently from each other, the server 102 may receive network status messages at a high enough rate that the resources of the server 102 (e.g., processor clock cycles) will be so consumed with handling the network status messages, that other tasks to be performed by the server are held in abeyance. For example, to a user attempting to configure an aspect of the network using the server 102, the server may operate undesirably slowly or even appear to have locked up.

In accordance with various embodiments, the server 102 comprises a pair of thresholds for each agent 150, 152 in the system. The agent-specific thresholds refer to the number of network status messages currently pending in an agent's queue 120. One threshold is an upper threshold and the other threshold is a lower threshold. The upper threshold is generally greater than the lower threshold. The terms "high water mark" (HWM) and "low water mark" (LWM) are also used herein as synonyms for the upper and lower thresholds, respectively. The agents' low and high water marks are stored in CRSM 106 as indicated at 124.

The high water mark for a given agent indicates the number of pending network status messages in a queue 120 at which the server 102 should command the corresponding agent to stop sending network status messages to the server. The agent-specific high water mark may be set to corresponding to any level with the queue and is shown conceptually in FIG. 1 along side a queue 120. Once the number of pending network status messages in a queue reaches the high water mark, the server 102 sends a "stop" message to the agent to request the agent to temporarily cease sending network status messages to the server to give the server a chance to catch up with the back log of pending messages.

The server 102 continues to retrieve network status messages from the queue for processing thereby reducing the number of pending messages in the queue. Once the number of messages pending in the queue falls below the low water mark for that agent, the server 102 sends a "start" message to the agent to request the agent to again send network status messages. The agent-specific low water mark may be set to corresponding to any level with the queue and is shown conceptually in FIG. 1 along side a queue 120.

In some embodiments, the high water marks for all of the agents 150, 152 are the same, and the low water marks for all of the agents are the same as well. The high and low water marks may be preset in some embodiments and user-configurable in other embodiments. A user of server 102 can configure the high and low water marks through server 102 using the input device 110 and output device 112. The software 122 may be configured to implement a graphical user interface (GUI) to permit a user to configure the high and low water marks. If the same low and high water marks are used for each agent's queue, then the server 102 need only maintain a single pair of water mark values if desired—that is, there is no need to have multiple high water mark value that are all the same. If desired, the high and low water marks for each agent 150, 152 can be separately configured for each agent. As such, the high and/or low water marks for one agent may be different than the high and/or low water marks for another agent. In this case, a separate pair of water mark values will be stored at 124 for each corresponding queue 120.

The server 102 also comprises a global high water mark and a global low water marks. Such global high and low water marks are also stored in CRSM 106 at 124 along with the agents' high and low water marks. The global high water mark corresponds to the server 102, not an individual agent. In particular, the global high water mark corresponds to the aggregate (i.e., total) number of network status messages presently pending all of the queues 120. When the aggregate number of messages in all of the queues exceeds the global high water mark, the server 102 sends a stop message to all agents 150, 152 to cause all agents to stop sending network status messages to the server. Even though no one agent 150, 152 is sending network status messages at a high enough rate to exceed any agent's high water mark, still the combined message rate from all agents may be too high for the server 102 to process all such messages and perform other task that the server might be tasked to perform. The global high water mark is useful to avoid such scenarios. In other embodiments, when the global high water mark is exceeded, a stop message is sent to one or more but not all agents. For example, the agent(s) with the most pending messages in a queue (e.g., number of pending messages exceeding a percentage of the capacity of the queue) may be sent a stop message.

After the server 102 issues stop message to all agents, the server 102 continues to retrieve network status messages from the agent queues 120 for processing thereby reducing the number of pending messages in the queues. In some embodiments, once the aggregate number of messages pending in the queues falls below the global low water mark, the server 102 sends a start message to all agents (or at least the agents that previously were sent a stop message) to permit the agents to again send network status messages to the server. In other embodiments, once the agents are stopped, each agent is restarted (by way of a start message) only when the number of pending messages in that agent's queue 120 falls below the agent low water mark for that particular agent.

It is possible that once the aggregate number of pending messages falls below the global low water mark, that the number of pending messages in one or more agent-specific queues 120 is still greater than the high water mark for that agent(s), or that the number of pending messages in a queue that was higher than the high water mark for that agent(s) but has not yet fallen below the low water mark for that agent(s). In that instance, even though the aggregate number of pending messages has fallen below the global low water mark, the server 102 does not send a start message to that particular agent(s) 150, 152 but sends the start message to all other agents.

When an agent 150, 152 has been commanded by the server 102 to cease sending network status messages to the server, the agents are permitted to continue collecting network status information and store the network status messages in a buffer 157 rather than sending the messages to the server. Then, when the agent receives a start message from the server, the agent retrieves the messages stored in buffer 157 and sends the messages to the server 102 along with any newly generated messages. It is possible that an agent 150, 152 is precluded for a long enough period of time from sending network status messages to the server 102 that the agent's buffer 157 is in danger of overflowing. In this case, the agent may be configured to copy the contents of buffer 157 to non-volatile storage such as a disk drive and continue storing additional network status messages to such storage. Alternatively, the agent may copy the contents of an almost filled buffer 157 to a disk drive, then free up the buffer 157 storing new network status messages. When the buffer 157 again becomes almost full, the buffer's contents can be copied to the disk drive and appended to the previously copied network status messages. This process can continue until the agent receives a start message from the server at which time the agent retrieves the network status messages from the disk drive and sends such messages to the server 102.

Figure 2:
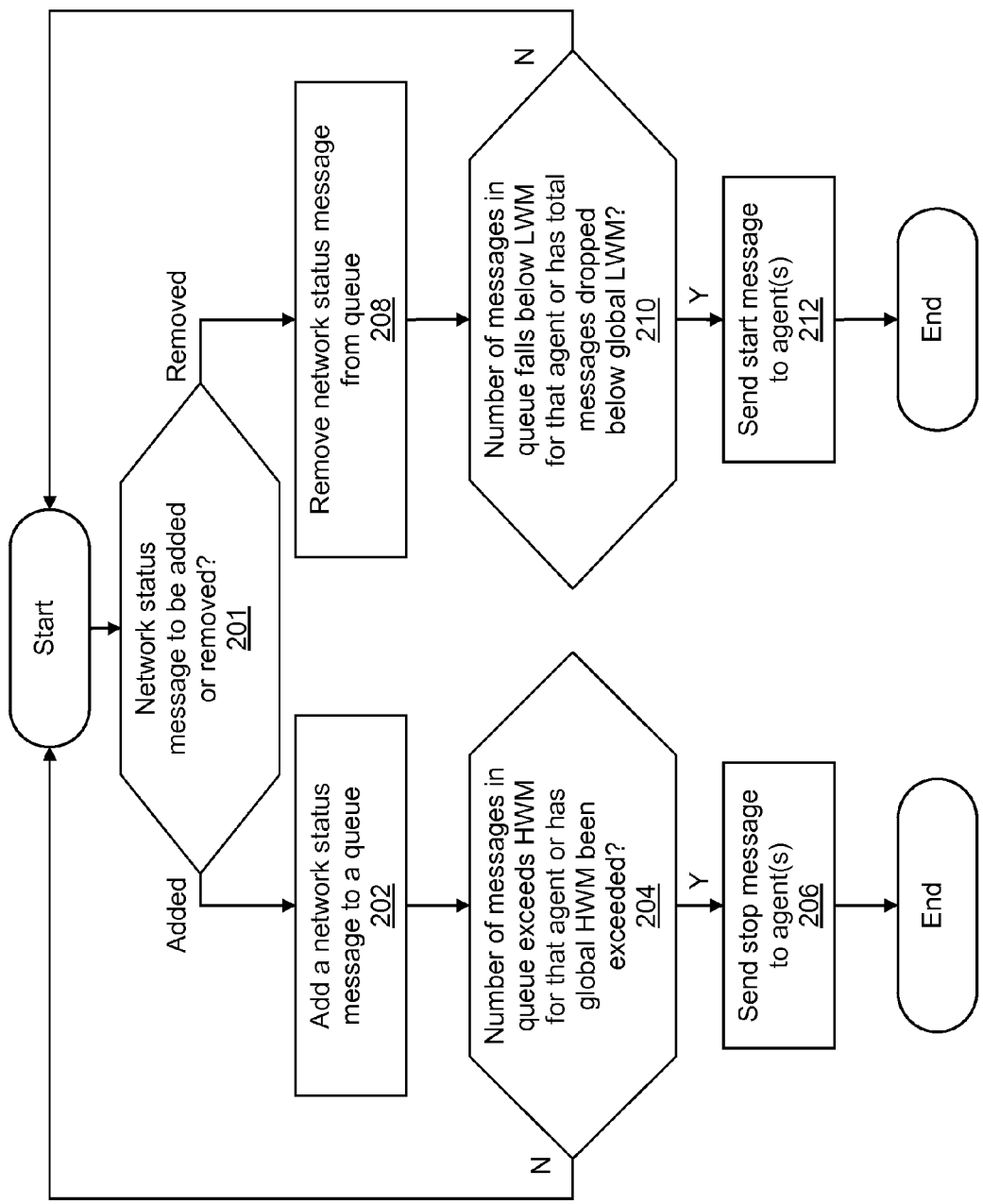
FIG. 2 shows a method in accordance with various embodiments.

FIG. 2 illustrates a method performed by the server 102. At 201, a network status message is either to be added or removed from an agent's queue 120. If a network status message is to be added, then control passes to 202 at which the status message is added to the agent's queue 120. Each time a message is added to an agent queue 120, the server 102 determines whether the relevant water mark has been exceeded. Upon adding a network status message to a queue (202), the server determines at 204 whether the number of messages in that queue exceeds the high water mark for that agent and whether the global high water mark has been exceeded by the aggregate number of pending message in all queues 120. If the agent-specific high water mark has been exceeded, then at 206 the server sends a stop message to that particular agent. If the global high water mark has been exceeded, then at 206 the server sends a stop message to one or more or all agents 150, 152 in the system as explained above. It is possible that adding a message to a queue 120 puts that particular queue over the agent's high water mark and also causes the global high water mark to be exceeded. The server 102 sends stop messages to all agents in this situation, not just the agent sending the message that caused the high water marks to be exceeded. If neither agent-specific nor global high water mark has been exceeded, then control loops back to the start of the method.

If a network status message is to be removed from an agent's queue 120, the control passes to 208 at which the message is removed from a queue 120. At 210, the server 102 determines whether the number of messages in that queue falls below the low water mark for that queue and whether the aggregate number of messages in all queues falls below the global low water mark. If the number of messages in the queue falls below the low water mark for that particular agent, then, if the high water mark had been exceeded, the server at 212 sends a start message to the agent to again send network status messages. If the aggregate number of messages falls below the global low water mark, then also at 212 the server sends a start message to all agents which previously had been exceeded. If the number of pending messages does not fall below either of the agent-specific or global low water marks, then control passes back to the start of the method.

Once the number of pending messages fall below the agent-specific low water mark, in some embodiments, only a single start message is sent to that message. As such, even though the agent has been instructed to re-start sending network status messages, if the server removes another message from that same queue (and again determines that the number of pending messages is below the low water mark, the server will not again send a start message. The same is true when the aggregate number of pending messages in all queues falls below the global low water mark—a start message is sent to all queues one time. Sending more than one start messages is possible in some embodiments, but is generally unnecessary.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a processor;
   a network interface coupled to the processor, wherein the network interface is to receive network status messages from a plurality of agents across a network, and wherein each network status message indicates a status of a portion of the network monitored by a respective agent; and
   storage accessible to the processor and the network interface, the storage comprising a plurality of queues, with each queue corresponding to an agent from the plurality of agents, and wherein network status messages from a given agent are stored by the storage in a queue in order of received network status messages corresponding to the agent pending processing by the processor,
   wherein, upon a number of network status messages in a queue for a particular agent exceeding an agent high water mark, the processor is to send a stop message through the network interface to such agent to cause such agent to cease sending network status messages, the processor is to further determine an aggregate number of network status messages in all of the queues to determine a global high water mark corresponding to the system, and
   wherein, in response to the aggregate number of network status messages in all of the queues exceeding the global high water mark, the processor is to send a stop message through the network interface to a number of selected agents from the plurality of agents that is less than a total number of the plurality of agents to cease sending network status messages, and wherein the selected agents are selected based on a number of pending network status messages for each of the selected agents irrespective of whether a selected agent has exceeded the agent high water mark for that selected agent.

2. The system of claim 1, wherein, in response to the number of network status messages in the queue falling below an agent low water mark, the processor is to send a start message through the network interface to such agent to cause such agent to again send network status messages.

3. The system of claim 1, wherein, in response to the aggregate number of network status messages in all of the queues exceeding the global high water mark, the processor is to send a stop message through the network interface to each of the agents to cause each agent to cease sending network status messages.

4. The system of claim 3, further comprising a global low water mark corresponding to the system and wherein, in response to the aggregate number of network status messages in all of the queues falling below the global low water mark, the processor is to send a start message through the network interface to each of the agents to cause each agent to again send network status messages.

5. The system of claim 1, further comprising, for each queue, an agent high water mark and an agent low water mark, the agent high and low water marks being separately configurable for each queue.

6. A system, comprising:
a processor;
a network interface coupled to the processor, wherein the network interface is to receive network status messages from a plurality of agents across a network, and wherein each network status message indicates a status of a portion of the network monitored by a respective agent; and
storage accessible to the processor and the network interface, the storage comprising a plurality of queues with each queue corresponding to an agent from the plurality of agents, and wherein network status messages from a given agent are stored by the storage in a queue corresponding to the agent pending processing by the processor,
wherein, upon a number of network status messages in a queue for a particular agent exceeding an agent high water mark, the processor is to send a stop message through the network interface to such agent to cause such agent to cease sending network status messages and, upon the number of network status messages in the queue falling below an agent low water mark the processor is to send a start message to such agent to again send network status messages, and
wherein, in response to an aggregate number of network status messages in all of the queues exceeding a global high water mark, the processor is to send a stop message through the network interface to a number of selected agents from the plurality of agents that is less than a total number of the plurality of agents to cease sending network status messages, and wherein the selected agents are selected based on a predetermined capacity of the queue for each of the selected agents irrespective of whether a selected agent has exceeded the agent high water mark for that selected agent.

7. The system of claim 6, further comprising a global low water mark wherein, in response to the aggregate number of network status messages in all of the queues falling below the global low water mark, the processor is to send a start message through the network interface to each of the agents to cause each agent to again send network status messages.

8. The system of claim 6, wherein the agent low and high water marks comprise thresholds and the threshold of the high water mark is greater than the threshold of the low water mark.

9. A method, comprising:
adding network status messages received over a network from remote agents into a plurality of queues, with each queue associated with one of the remote agents, each network status message indicating a status of a portion of the network monitored by a respective agent;
storing the queues pending processing of the network status messages;
upon adding a network status message to one of the queues, determining if a number of network status messages in the queue exceeds an agent-specific upper threshold;
when the number of network status messages in the queue exceeds the agent-specific upper threshold, sending a stop message to a remote agent associated with the queue over the network, the stop message requesting the remote agent to cease sending network status messages;
removing a network status message from the queue for processing;
upon removing the network status message from the queue, determining if the number of network status messages in the queue falls below an agent-specific lower threshold;
when the number of network status messages falls below the agent-specific lower threshold, sending a start message to the remote agent, the start message requesting the remote agent to again send network status messages;
determining if an aggregate number of network status messages in the plurality of queues exceeds a global upper threshold;
in response to the aggregate number of network status messages in the plurality of queues exceeding the global upper threshold, sending a stop message through the network interface to a number of selected remote agents from the remote agents that is less than a total number of the remote agents to cease sending network status messages; and
selecting the selected remote agents based on a number of pending network status messages for each of the selected remote agents irrespective of whether a selected remote agent has exceeded the agent-specific upper threshold for that selected remote agent.

10. The method of claim 9, wherein the agent-specific upper threshold corresponds to just the remote agent associated with the queue.

11. The method of claim 9, wherein when the aggregate number of network status messages exceeds the global upper threshold, sending a stop message to all of the remote agents in the network to cease sending network status messages.

12. The method of claim 9, further comprising, in response to removing the network status message from the queue, determining if the aggregate number of network status messages in the plurality of queues is below a global lower threshold.

13. The method of claim 12, wherein, in response to the aggregate number of network status messages being below the global lower threshold, sending a start message to at least one remote agent in the network to start sending network status messages.

14. The system of claim 1, further comprising a global low water mark corresponding to the system and wherein, in response to the aggregate number of network status messages in all of the queues falling below the global low water mark, the processor is to send a start message through the network interface to a selected number of the agents that is less than a total number of the agents to cause the selected agents to again send network status messages.

15. The system of claim 1, wherein, in response to receipt of the stop message, the agent is to continue collecting network status information and store network status messages in a buffer.

* * * * *